June 23, 1936.  H. J. JUDD  2,045,189

FLOWERPOT

Filed Aug. 16, 1935

Inventor:
Harold John Judd
By Emil Bonnelycke
Attorney

Patented June 23, 1936

2,045,189

UNITED STATES PATENT OFFICE 2,045,189

FLOWERPOT

Harold John Judd, London, England, assignor to The United Glass Bottle Manufacturers Limited, London, England, a British company Application August 16, 1935, Serial No. 36,605
In Great Britain September 28, 1934

1 Claim. (Cl. 47—34)

This invention relates to flower pots and has for its object the provision of an improved form of flower pot possessing certain marked advantages over the usual forms of pottery clay pots.

In accordance with the invention the improved form of flower pot is composed of glass, it having been found that, when growing plants accommodated in a glass flower pot are watered, the evaporation of moisture is considerably less than in the case when they are accommodated in porous clay or earthenware pots. Thus the large fall in temperature which results from evaporation when using porous clay pots can be eliminated or rendered more gradual and the plant roots can be maintained at a more even temperature and under more advantageous conditions for proper growth. However, owing to the decrease in the rate of evaporation, the plants do not require to be watered so frequently as when accommodated in the usual forms of porous clay pots.

According to a further feature of the invention the bottom of the pot is formed with a plurality of radially disposed channels leading to a central opening thereby facilitating the draining away of any excess moisture tending to collect in the lower part of the pot.

In order that the said invention may be clearly understood and readily carried into effect, the same will now be more fully described with reference to the accompanying drawing, in which:—

Figure 1:
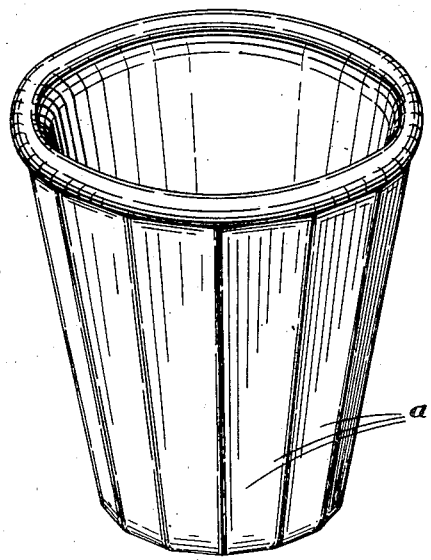
Fig. 1 is a perspective view.
Figure 2:
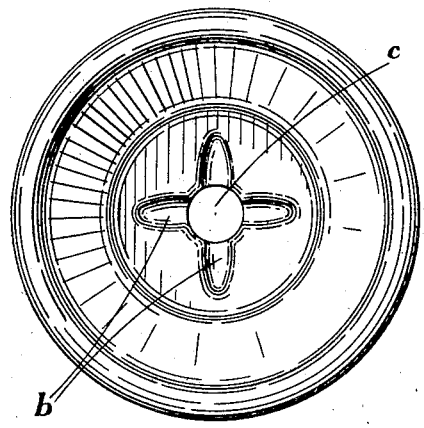
Fig. 2 is a plan view of a glass flower pot produced in accordance with the invention.

It will be observed that the outer surface of the pot is formed with a series of downwardly tapering facets $a$ and that the inner surface of the bottom portion of the pot is provided, for the purpose above specified, with four radially disposed grooves or channels $b$ extending outwardly from the usual central opening $c$.

The glass flower pot produced in accordance with the invention is preferably composed of coloured glass, e. g. a rich shade of amber glass, thereby obviating the unsightly appearance of the usual form of clay pot and enabling it to be used in the household without the necessity of employing a second vessel or other outer covering for hiding its appearance as is usually the case with the clay pots. Glass flower pots also possess numerous other advantages, e. g. the plants are more easily removed from the pots for bedding out and, consequently, breakages are less. Also the glass pots are easier to clean and, owing to their transparency, they enable the condition of the roots and the amount of moisture present in the soil to be readily observed.

Having thus described my invention, what I claim as new therein and desire to secure by Letters Patents is:—

A one-piece flower pot composed of glass and having a flat bottom formed with a central opening, the inner surface of the bottom portion being formed with a plurality of radially disposed channels leading to the said opening so as to facilitate the draining away of any excess moisture tending to collect in the lower part of the pot.

HAROLD JOHN JUDD.